United States Patent
DeJager

[11] 3,910,685
[45] Oct. 7, 1975

[54] THREE ELEMENT OBJECTIVE LENS WITH ASPHERES ON REAR SURFACES OF FIRST AND SECOND ELEMENTS

[75] Inventor: Donald DeJager, Rochester, N.Y.
[73] Assignee: Eastman Kodak Company, Rochester, N.Y.
[22] Filed: Nov. 5, 1974
[21] Appl. No.: 521,225

[52] U.S. Cl. ............... 350/226; 350/176; 350/189; 350/206
[51] Int. Cl.² .. G02B 3/04; G02B 9/16; G02B 13/18
[58] Field of Search ............... 350/226, 189, 176

[56] References Cited
UNITED STATES PATENTS

| | | | |
|---|---|---|---|
| 3,762,801 | 10/1973 | Baker | 350/189 |
| 3,838,910 | 10/1974 | Ruben | 350/226 X |
| 3,868,173 | 2/1975 | Miles et al. | 350/189 X |

*Primary Examiner*—John K. Corbin
*Attorney, Agent, or Firm*—R. F. Brothers

[57] ABSTRACT

A three element objective lens having a front positive meniscus element, a middle negative element and a rear positive biconcave element. Improved optical performance at a relative aperture of at least f/1.33 is achieved by the use of aspheres on the rear surfaces of the first and second elements.

2 Claims, 1 Drawing Figure

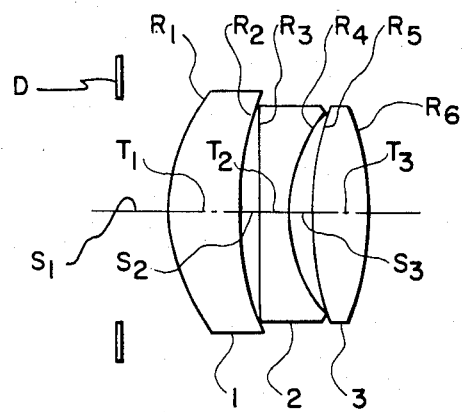

THREE ELEMENT OBJECTIVE LENS WITH ASPHERES ON REAR SURFACES OF FIRST AND SECOND ELEMENTS

BACKGROUND OF THE INVENTION

1. Field of the Invention

This invention relates to photographic objective lenses and in particular to such lenses that comprise three air spaced elements.

2. Description of the Prior Art

Triplet lenses for use in photographic apparatus are well known and have been used for many years. Moreover, high relative aperture lenses have also been in use for many years in the photographic industry. However, with the advent of available light photography, the use of high relative aperture lenses has spread to photographic apparatus designed to be mass produced for the amateur market. The price of such lenses then becomes of great concern and the relatively complex, well corrected, high aperture lenses known in the art are too costly.

Another trend in the photographic industry is toward compact designs to provide convenience in storage, handling and transportation. Large, complex lenses represent a sizable percentage of the camera's volume and place a lower limit on the size of the photographic apparatus. A reduction in the number of elements in a lens will generally aid in reducing the size and cost of the lenses to be incorporated in the photographic apparatus.

SUMMARY OF THE INVENTION

In accordance with the present invention, there is provided a three element lens having a front positive meniscus element, a middle plano-concave or meniscus negative element and a rear positive biconvex element. The rear surfaces of the first and second elements are aspherical.

BRIEF DESCRIPTION OF THE DRAWING

In the detailed description of the preferred embodiment of the invention presented below, reference is made to the accompanying drawing which is a diagrammatic cross section according to the present invention.

DESCRIPTION OF THE PREFERRED EMBODIMENT

For all purposes of describing or claiming of the invention the term lens will be used to describe the complete lens and not the elements thereof. In the drawing, the elements are numbered from left to right with Arabic numerals. In each of the examples, the elements, indices of refraction N, Abbe numbers V, radii of curvature R, thicknesses T, and air spaces S are numbered to correspond with the drawing. The indices of refraction are for the 0.5876 micron Helium $d$ line of the spectrum. The Abbe numbers are calculated using this spectrum $d$ line index and, as the dispersion, the index difference between the 0.4861 and 0.6563 micron Hydrogen F and C lines of the spectrum. Radii of curvature having centers of curvature to the right of the surface are considered positive; those with centers of curvature to the left of the surface are considered negative.

In all embodiments of the invention as illustrated in the drawing, the lens comprises three air spaced elements. Element 1 is a front positive meniscus element. Element 2 is a middle negative plano-concave or meniscus element. Element 3 is a rear positive biconvex element. D is a diaphragm.

The use of aspheric surfaces in a lens design provides additional parameters for correction of aberrations. Incorporation of an aspheric surface is particularly useful in a high relative aperture lens, because it permits a better correction of spherical aberration than otherwise obtainable. In the design of the present invention, the improved spherical aberration correction and the reduction of other aberrations, along with the high relative aperture, are achieved by the use of aspheres on the rear surfaces of the first two elements of the lens.

A general aspheric surface may be described by the following equation:

$$x = \frac{Cg^2}{1+\sqrt{1-(1+K)C^2y^2}} + Dy^4 + Ey^6$$

This equation describes a surface in terms of its surface sag $x$ at a semi-aperture distance $y$ from the axis of the lens. The constant C is the vertex curvature, that is, the surface curvature at the vertex of the lens, and is equal to the reciprocal of the vertex radius of curvature R. Certain values of K describe conic sections or surfaces of revolution about the optical axis of the lens. The coefficients D and E determine the first and second terms of higher order aspheric sag of the surface. Terms higher than the sixth in the equation for $x$ may also be included, if desired.

In order to determine which of the six surfaces to make aspherical, it is necessary to consider the nature of the aberrations to be corrected. In the case of spherical aberration, the surface chosen for this purpose should be located where the central or chief ray of each oblique beam crosses the optical axis. In these lenses, the upper ray of the oblique beam is not determined by the diaphragm stop at the front, but rather by a baffle at the rear of the lens. The diameter of this baffle is such as to pass the full axial beam, and to introduce vignetting of the upper rays of the oblique beams. Thus the central ray of any oblique beam enters the diaphragm stop below the optical axis, and crosses it near surface 2. Surface 2 has, therefore, been selected for aspherizing.

The correction of astigmatism and particularly coma in the oblique beams is facilitated by the use of an asphere on the rear surface of the negative element, since this is normally the strongest and most sensitive surface in any triplet design. It has been invariably found that the shape of this surface, if allowed to become aspheric, tends toward a hyperboloid, i.e., the surface sags of the outer zones tend to be less than those of a sphere of equivalent vertex power.

Lenses may be made according to this invention by following the specifications in the preferred embodiments presented below:

EXAMPLE I

| | F=10.00 | | f/1.33 | |
|---|---|---|---|---|
| Element | N | V | Radius mm | Thickness or Separation mm |
| | | | | $S_1$=1.800 |
| 1 | 2.01940 | 34.21 | $R_1$=6.0159 | $T_1$=2.550 |
| | | | $R_2$=Asphere | |
| | | | | $S_2$=.550 |

EXAMPLE I-Continued

F=10.00   f/1.33

| Element | N | V | Radius mm | Thickness or Separation mm |
|---|---|---|---|---|
| 2 | 2.00000 | 18.80 | $R_3$=Plano | $T_2$=1.000 |
| | | | $R_4$=Asphere | |
| | | | | $S_3$=.800 |
| 3 | 2.01940 | 34.21 | $R_5$=11.166 | $T_3$=1.850 |
| | | | $R_6$=−9.9168 | |

Example I is a triplet objective lens having a focal length of 10.00mm, a relative aperture of $f/1.33$, and a semi-field angle of 19.80°. The desired optical performance is achieved by the use of extremely high index glasses along with the use of a hyperboloid on surface 4, and with surface 2 being aspherized to incorporate a higher order correction. The respective coefficients which define the aspheric surfaces are tabulated below:

Table I

| Surface | R | K | D | E |
|---|---|---|---|---|
| 2 | 20.644 | 0 | $1.355 \times 10^{-4}$ | 0 |
| 4 | 4.1152 | −1.4 | 0 | 0 |

EXAMPLE II

F=9.00   f/1.20

| Element | N | V | Radius mm | Thickness or Separation mm |
|---|---|---|---|---|
| | | | | $S_1$=1.800 |
| 1 | 2.01940 | 34.21 | $R_1$=6.0730 | $T_1$=2.180 |
| | | | $R_2$=Asphere | |
| | | | | $S_2$=.600 |
| 2 | 2.00000 | 18.80 | $R_3$=227.83 | $T_2$=.800 |
| | | | $R_4$=Asphere | |
| | | | | $S_3$=.760 |
| 3 | 2.01940 | 34.21 | $R_5$=11.574 | $T_3$=2.160 |
| | | | $R_6$=−8.6043 | |

Example II is a triplet objective lens having a focal length of 9.00 mm, a relative aperture of $f/1.20$, and a semi-field angle of 21.80°. The desired optical performance is achieved by the use of an ellipsoid on surface 2 and a hyperboloid on surface 4, with higher order corrections added on both surfaces.

The respective coefficients which define the aspheric surfaces are tabulated below:

TABLE II

| Surface | R | K | D | E |
|---|---|---|---|---|
| 2 | 29.038 | 59.45 | $1.5317 \times 10^{-4}$ | $-0.8334 \times 10^{-6}$ |
| 4 | 3.9421 | −1.1184 | $-1.0557 \times 10^{-4}$ | $-2.2321 \times 10^{-6}$ |

While there are many ways to judge the optical performance of a particular lens, one criteria is the image formed of a point object, with the size of the image taken as the diameter of the circle which contains 50 percent of the rays. Light rays of three different wavelengths, 0.44; 0.55 and 0.65 micron, were utilized in the relative ratio of 15:50:35. Rays were then traced at seven different field angles through each lens. The parameters listed in Table III illustrate the results of these computations for the lenses of Examples I and II and for a sample lens which is a six element, all spherical lens having a focal length of 9.00 mm and a relative aperture of $f/1.2$.

TABLE III

| Lens | Axis | 40% | 60% | 75% | 85% | 90% | 100% |
|---|---|---|---|---|---|---|---|
| Example I 10mm f/1.33 | 4.1 | 2.7 | 3.2 | 4.2 | 5.5 | 6.2 | 5.6 |
| Example II 9mm f/1.2 | 3.9 | 2.8 | 4.8 | 6.1 | 6.6 | 7.0 | 8.5 |
| Sample 9mm f/1.2 | 3.5 | 4.1 | 6.4 | 8.8 | 10.7 | 12.9 | 18.7 |

By comparison of the 50 percent spot diameters in Table III, it is seen that optical quality of the triplets utilizing aspheres on surfaces 2 and 4 is close to or better than the optical quality obtained with the six element, all spherical sample lens. Especially note the comparison of the sample lens with Example II, both lenses having the same focal length and relative aperture.

The invention has been described in detail with particular reference to preferred embodiments thereof, but it will be understood that variations and modifications can be effected within the spirit and scope of the invention.

I claim:

1. A three element lens comprising a front positive element, a middle negative and a rear positive element, said lens having aspheric surfaces on the rear of said front and middle elements and wherein said lens has a focal length of 10.00mm when constructed according to the following parameters:

| Element | N | V | Radius mm | Thickness or Separation mm |
|---|---|---|---|---|
| | | | | $S_1$=1.800 |
| 1 | 2.01940 | 34.21 | $R_1$=6.0159 | $T_1$=2.550 |
| | | | $R_2$=Asphere | |
| | | | | $S_2$=.550 |
| 2 | 2.00000 | 18.80 | $R_3$=Plano | $T_2$=1.000 |
| | | | $R_4$=Asphere | |
| | | | | $S_3$=.800 |
| 3 | 2.01940 | 34.21 | $R_5$=11.166 | $T_3$=1.850 |
| | | | $R_6$=−9.9168 | | wherein, from front to rear, the elements are numbered from 1 to 3, the corresponding indices of refraction, N, and Abbe numbers, V, are listed for each element, the radii of curvature of the surfaces are numbered from $R_1$ to $R_6$, the thicknesses of the elements are numbered from $T_1$ to $T_3$, the spacings between the diaphragm and the elements are numbered from $S_1$ to $S_3$, and wherein $R_2$ and $R_4$ represent the radius of curvature at the vertex of an aspheric surface defined by the following formula and parameters:

$$X = \frac{Cy^2}{1+\sqrt{1-(1+K)C^2y^2}} + Dy^4$$

| Surface | R | K | D |
|---|---|---|---|
| 2 | 20.644 | 0 | $1.355 \times 10^{-4}$ |
| 4 | 4.1152 | −1.4 | 0 | wherein $x$ is the sag of an aspheric surface from a plane reference surface at a radial distance $y$ from the axis of the lens, C is equal to the reciprocal of the vertex radius of curvature R and K is the conic constant.

2. A three element lens comprising a front positive element, a middle negative element and a rear positive element, said lens having aspheric surfaces on the rear of said front and middle elements and wherein said lens has a focal length of 9.00 mm when constructed according to the following parameters:

| Element | N | V | Radius mm | Thickness or Separation mm |
|---|---|---|---|---|
| 1 | 2.01940 | 34.21 | $R_1$=6.0730 | $S_1$=1.800 |
|   |   |   |   | $T_1$=2.180 |
|   |   |   | $R_2$=Asphere | $S_2$=.600 |
| 2 | 2.00000 | 18.80 | $R_3$=227.83 | $T_2$=.800 |
|   |   |   | $R_4$=Asphere | $S_3$=.760 |
| 3 | 2.01940 | 34.21 | $R_5$=11.574 | $T_3$=2.160 |
|   |   |   | $R_6$=−8.6043 |   | wherein, from front to rear, the elements are numbered from 1 to 3, the corresponding indices of refraction, N, and Abbe numbers, V, are listed for each element, the radii of curvature of the surfaces are numbered from $R_1$ to $R_6$, the thicknesses of the elements are numbered from $T_1$ to $T_3$, the spacings between the diaphragm and elements are numbered from $S_1$ to $S_3$, and wherein $R_2$ and $R_4$ represent the radius of curvature at the vertex of an aspheric surface defined by the following formula and parameters:

$$X = \frac{Cy^2}{1+\sqrt{1-(1+K)C^2y^2}} + Dy^4 + Ey^6$$

| Surface | R | K | D | E |
|---|---|---|---|---|
| 2 | 29.038 | 59.45 | $1.5317 \times 10^{-4}$ | $-0.8334 \times 10^{-6}$ |
| 4 | 3.9421 | −1.1184 | $-1.0557 \times 10^{-4}$ | $-2.2321 \times 10^{-6}$ | wherein $x$ is the sag of an aspheric surface from a plane reference surface at a radial distance $y$ from the axis of the lens, C is equal to the reciprocal of the vertex radius of curvature R and K is the conic constant.

* * * * *